United States Patent Office 3,035,953
Patented May 22, 1962

3,035,953
LAMINATES OF ALUMINUM AND SOLID POLYMERS OF 1-OLEFINS
Philip M. Arnold, Bartlesville, Okla., assignor to Phillips Petroleum Company, a corporation of Delaware
No Drawing. Filed Mar. 24, 1958, Ser. No. 723,094
10 Claims. (Cl. 154—43)

This invention relates to laminates of aluminum and solid polymers of 1-olefins. In one aspect, it relates to forming laminates of aluminum and solid polymers of 1-olefins, bonded with cured hydrogenated butadiene polymer.

Aluminum, because of its light weight and very desirable electrical properties, finds widespread use in construction where weight is an important factor and also in the transmission of electricity and in electrical devices. In many instances, it is desirable to provide a protective coating over the aluminum articles to shield them from corrosive materials. Particularly suitable coating materials are polymers of 1-olefins, such as polyethylene. These polymers, because of their desirable thermal and electrical properties, can also be used in combination with aluminum when it is desired to provide an insulating effect or prevent electrical conduction and at the same time gain the strength and weight properties of the aluminum. Polyethylene is bonded to other materials with some difficulty and one of the problems associated with laminates of polyethylene is finding an adhesive which will provide a strong and essentially permanent bond.

It is an object of this invention to provide laminates of aluminum and solid polymers of 1-olefins.

Another object of the invention is to provide laminates of aluminum and solid polymers of 1-olefins, bonded together with cured hydrogenated butadiene polymer.

Still another object of the invention is to provide an improved process for the manufacture of laminates of aluminum and solid polymers of 1-olefins.

Yet another object of the invention is to provide an improved process for the manufacture of laminates of aluminum and polyethylene bonded with cured hydrogenated butadiene polymer.

These and other objects of the invention will become more readily apparent from the following detailed description and discussion.

The laminates of this invention comprise laminates of aluminum with a solid polymer of a 1-olefin, bonded with cured hydrogenated butadiene polymer.

In one aspect of the invention, the above laminates are prepared by interposing a coating of hydrogenated butadiene polymer adhesive between aluminum and a solid polymer of a 1-olefin and pressing the aluminum and polymer to be bonded while heating at a temperature exceeding the softening point of said polymer to cure said adhesive.

The polymers which are utilized within the scope of this invention include a wide variety of olefin polymers, such as, for example, polymers or copolymers of monoolefins like ethylene, propylene, butylene, etc. The invention is particularly applicable to polymers of 1-olefins having a maximum of 8 carbon atoms per molecule and no branching nearer the double bond than the 4-position, and more particularly to polymers of ethylene which have a specific gravity of at least 0.94 at 20° C. and preferably 0.96 or higher and a crystallinity of at least 70 percent and preferably at least 80 percent at ordinary room temperatures.

A preferred polymerization method is described in detail in a copending application of Hogan and Banks, Serial No. 573,877, filed March 26, 1956, now Patent No. 2,825,721. This particular method utilizes a chromium oxide catalyst, containing hexavalent chromium with silica, alumina, silica-alumina, zirconia, thoria, etc. In one embodiment of this application, olefins are polymerized in the presence of a hydrocarbon diluent, for example, an acyclic, cycloaliphatic or, less preferably, aromatic compound which is inert and in which the formed polymer is soluble. The reaction is ordinarily carried out at a temperature between about 150° F. and about 450° F. and usually under a pressure sufficient to maintain the reactant and diluent in the liquid state. The polymers produced by this method, particularly the polymers of ethylene, are characterized by having an unsaturation which is principally either transinternal or terminal vinyl, depending on the particular process conditions employed. When low reaction temperatures, about 150° F. to about 320° F. and a mobile catalyst are used for polymerization, the product polymer is predominantly terminal vinyl in structure. When polymerization is carried out at higher temperatures and in a fixed catalyst bed, the polymer has predominantly transinternal unsaturation. Polymers prepared by both methods are also characterized by their high densities and high percentage of crystallinity at normal room temperatures.

Other less advantageous procedures which employ different catalysts are also used for preparing olefin polymers. For example, polymers are prepared in the presence of organometallic compounds such as triethylaluminum plus titanium tetrachloride, mixtures of ethyl aluminum halides with titanium tetrachloride, and the like. Another group of catalysts which is used comprises a halide of a group IV metal such as, for example, titanium tetrachloride, silicon tetrabromide, zirconium tetrachloride, tin tetrabromide, etc., with one or more free metals selected from the group consisting of sodium, potassium, lithium, rubidium, zinc, cadmium and aluminum. In addition, olefin polymers can be prepared by the well-known high-pressure techniques and by the use of other polymerization catalysts which are well-known in the art.

The butadiene polymers from which the hydrogenated polymers are prepared include homopolymers of butadiene and copolymers of butadiene with styrene, using not over 30 parts by weight of styrene per 100 parts by weight of monomers. The preparation of these polymers is the subject matter of the copending application of Jones and Moberly, Serial No. 395,291, filed November 30, 1953, now U.S. Patent 2,864,809. Broadly, this process comprises dispersing or dissolving one of these cited polymers prepared at a temperature of −5° F. to 140° F. in a solvent and contacting the mixture with hydrogen in the presence of a nickel-kieselguhr catalyst which has been activated by contact with hydrogen. Suitable solvents include cyclohexane, methylcyclohexane, decalin, and the like. The hydrogenation is conducted until the unsaturation has been reduced to a value which does not exceed 50 percent of the original saturation of the polymer as determined by the method of Lee et al., Journal of Polymer Science, vol. 36684 (1948). Preferably, the unsaturation of the hydrogenated polymer is in the range of 5 to 30 percent of the original unsaturation of said polymer.

The hydrogenated butadiene polymer adhesive which is used in forming the laminates of this invention can contain any of the compounding ingredients which are known and used in the art in recipes for curing polymers and rubbers. These include the conventional vulcanizing agents, vulcanizing accelerators, antioxidants, accelerator activators, and the like. Specific curing systems which can be employed include sulfur with various vulcanization accelerators, and dicumyl peroxide. Curing systems for hydrogenated butadiene polymers, employing sulfur and dicumyl peroxide are described in "Hydrogenated Synthetic Elastomers," Jones et al., Ind. & Eng. Chem., 45, 1117, May 1953, and the copending application of Railsback, Serial No. 560,281, filed January 20, 1956.

When forming the laminates, it is preferred to clean the portion of the aluminum article to which the hydrogenated butadiene polymer is to be applied. For example, the aluminum article can be degreased by treatment with a solvent such as carbon tetrachloride or tetrachlorethane, followed by a chromic acid treatment. The hydrogenated butadiene polymer adhesive is then applied to the clean surface of the aluminum in the form of a solution. Suitable solvents for the hydrogenated polymer are benzene, toluene, cyclohexane, methylcyclohexane, decalin, tetralin, isooctane, and the like. The hydrogenated polymer adhesive is also applied to the desired polyolefin surface in solution in the solvents. As desired, the adhesive can be applied to either of the surfaces or to both surfaces, the latter procedure being preferred. Generally, solutions containing from 2 to 10 percent by weight of hydrogenated butadiene polymer are employed, although higher or lower concentrated solutions can be employed if so desired. Following the application of the adhesive to the surfaces to be bonded, removal of solvent from the adhesive is effected. This can be provided by allowing the coated surfaces to stand exposed to air at room temperature until the solvent evaporates, or if a quicker procedure is preferred, evaporation of the solvent can be aided by subjecting the coated articles to contact with a heated gas, such as air or by other heating. Usually, if heating is employed as an aid in removing the solvent from the adhesive, it is desirable that the maximum temperatures used not exceed about 150° F., since at higher temperatures the possibility of curing of the adhesive exists. When the adhesive is suitably reduced in solvent content, the adhesive coated sides of the articles to be bonded are pressed together and subjected while under pressure to an elevated temperature, above the softening point of the olefin polymer, whereby curing of the adhesive and the formation of a firmly bonded laminate is provided. The pressures employed in this operation can vary over a wide range, however, usually it is desirable to operate with more elevated pressures, for example, in the range of between 10 and about 1000 p.s.i. Lower and higher pressures can be employed, if desired. The temperatures required to effect curing of the hydrogenated polymer in the adhesive are usually between about 200 and about 500° F. and vary depending on the particular polymer which is used in the laminate. The minimum temperature which can be employed is the softening temperature of the olefin polymer being bonded. Usually temperatures within the range of between 0 and about 150° F. above the softening point of the olefin polymer are used, and more preferably from 25 to 100° F. above the olefin polymer softening point. The time of cure will also vary depending on the adhesive used and the polymer article being bonded. In general, satisfactory results are obtained by carrying out curing for a period of time between about five minutes and about two hours. In one embodiment of the invention, when the laminate comprises aluminum and polyethylene prepared in a chromium oxide catalyzed polymerization, as set forth in the cited Hogan and Banks patent, the hydrogenated butadiene polymer adhesive is cured at a temperature which is about 35° F. above the softening point of the polymer, for 30 to 40 minutes.

While the laminates of this invention comprise broadly an aluminum layer, a hydrogenated butadiene polymer adhesive layer and a polyolefin layer, the invention is particularly applicable to laminates in which the polyolefin is the high-density, high-crystalline type which results from chromium oxide catalyzed polymerization and more particularly high density, highly crystalline polyethylene. The laminates of this invention can comprise one or more plies of aluminum and solid olefin polymer, each ply being bonded with cured hydrogenated butadiene polymer.

The laminates of this invention find utility as insulating materials, structural numbers, such as tanks, insulated wires and cables, etc., and the like.

The following example is presented in illustration of one embodiment of the invention.

EXAMPLE

A run was made in which polyethylene was bonded to aluminum by means of a hydrogenated polybutadiene adhesive.

The polyethylene was prepared in accordance with the polymerization method of Hogan and Banks in the presence of cyclohexane and a catalyst comprising about 2.5 percent by weight of chromium as chromium oxide, containing hexavalent chromium, with silica-alumina, prepared by impregnation of the silica-alumina with chromium oxide, followed by drying and activation in dry air.

The conditions employed in preparing the polymer were as follows:

| | |
|---|---|
| Reactor temperature | 285. |
| Reactor pressure | 500. |
| Polymer concentration | [1] 8–10 wt. percent. |
| Catalyst concentration | [1] 0.3 wt. percent. |

[1] Based on cyclohexane diluent.

Hydrogenated polymer was prepared by hydrogenating rubbery butadiene polymer from an emulsion polymerization in the presence of nickel on kieselguhr hydrogenation catalyst. The conditions employed were as follows.

*Polymer Recipe*

| Ingredient: | Parts by weight |
|---|---|
| Butadiene | 100. |
| Water | 220. |
| Potassium salt of disproportionated resin acid | 5.0. |
| KOH | 0.1. |
| KCl | 0.5. |
| Sodium salt of condensed alkyl aryl sulfonic acid | 0.1. |
| Ethylene diamine tetraacetic acid | 0.023. |
| Sodium formaldehyde sulfoxylate | 0.05. |
| p-Menthane hydroperoxide | 0.06. |
| Tert-dodecyl mercaptan [1] | 0.43. |
| Antioxidant [2] | 1.0 (based on polymer). |
| Shortstop [3] | Variable. |
| Temperature | 41° F. |
| Time | 10.2 hours. |
| Conversion | 60%. |
| Blowdown Mooney (ML–4) | 26. |

[1] The modifier was rinsed into the reactor with 0.25 part of methanol per 100 parts of butadiene.
[2] Tris-nonylphenyl phosphite.
[3] Five polymerization runs were made according to the above recipe. All of these runs are labeled PE606–L153. Different amounts of shortstop were employed in each of these runs, and these amounts are shown in the following table:

AMOUNT OF SHORTSTOP EMPLOYED

PE606–L153B—0.3 part di-tert-butyl hydroquinone (DTBH)
PE606–L153D—0.2 part DTBH+0.1 part hydroquinone
PE606–L153H—0.2 part DTBH
PE606–L153G—0.2 part DTBH+0.1 part potassium dimethyldithiocarbamate
PE606–L153F—0.2 part DTBH+0.1 part sodium dimethyldithiocarbamate

*Polymer Hydrogenation*

| | |
|---|---|
| Temperature | 450° F. |
| Hydrogen pressure | 500 p.s.i.g. |
| Reaction time | 3 hours. |
| Polymer concentration | [1] 9.3 weight percent. |
| Catalyst concentration | [2] 5.5 weight percent. |

[1] Based on methylcyclohexane solvent.
[2] Based on polymer.

The hydrogenated polybutadiene, which contained 24 percent unsaturation based on 100 percent unsaturation of the polybutadiene prior to hydrogenation, was compounded according to the following recipe.

Compounding Recipe

| Ingredient: | Parts by weight |
|---|---|
| Hydrogenated polybutadiene | 100 |
| Zinc oxide | 4 |
| Stearic acid | 2 |
| Antioxidant[1] | 1 |
| Sulfur | 2 |
| Accelerator A[2] | 1 |
| Accelerator B[3] | 0.2 |

[1] Para-benzyloxyphenol.
[2] N-cyclohexyl-2-benzothiazole-sulfenamide.
[3] Reaction product of butyraldehyde and butylidene aniline.

A five percent by weight solution of the compounded hydrogenated polybutadiene in toluene was brushed onto one side of aluminum strips which had previously been degreased with carbon tetrachloride and treated with a solution of potassium dichromate in concentrated sulfuric acid. Hydrogenated polybutadiene solution was also brushed onto both sides of a one-inch square of the polyethylene. The coated materials were then allowed to air dry, after which the polyethylene square was clamped between the coated aluminum strips and cured at 307° F. for 30 minutes. A pull of 800 p.s.i. was required to pull the polyethylene-aluminum laminates apart.

Another run was made according to the above procedure except it was attempted to cure the laminate below the softening point of the polyethylene, i.e. 265° F. No adhesion resulted.

Having thus described the invention by providing a specific example thereof, it is to be understood that no undue limitations or restrictions are to be drawn by reason thereof and that many variations and modifications are within the scope of the invention.

I claim:

1. An article of manufacture comprising a laminate of aluminum and a solid polymer of a 1-olefin having a maximum of 8 carbon atoms per molecule and no branching nearer the double bond than the 4-position, bonded with a cured hydrogenated polymer selected from the group consisting of hydrogenated homopolymers of butadiene and hydrogenated copolymers of butadiene and styrene containing not over 30 percent of bound styrene, having an unsaturation not exceeding 50 percent of the unsaturation of the unhydrogenated polymer.

2. An article of manufacture comprising a laminate of aluminum and polyethylene, bonded with a cured hydrogenated polymer selected from the group consisting of hydrogenated homopolymers of butadiene and hydrogenated copolymers of butadiene and styrene containing not over 30 percent of bound styrene, having an unsaturation not exceeding 50 percent of the unsaturation of the unhydrogenated polymer.

3. A method for bonding aluminum and a solid polymer of a 1-olefin having a maximum of 8 carbon atoms per molecule and no branching nearer the double bond than the 4-position which comprises interposing therebetween a coating of a hydrogenated polymer adhesive, said hydrogenated polymer being selected from the group consisting of hydrogenated homopolymers of butadiene and hydrogenated copolymers of butadiene and styrene containing not over 30 percent of bound styrene, said hydrogenated polymer having an unsaturation not exceeding 50 percent of the unsaturation of the unhydrogenated polymer, and pressing the aluminum and polymer to be bonded while heating at a temperature exceeding the softening point of the 1-olefin polymer, but not more than 150 Fahrenheit degrees above said softening point to cure said adhesive.

4. The method of claim 3 in which the 1-olefin is ethylene.

5. A method, for bonding aluminum and a solid polymer of ethylene, comprising interposing therebetween a coating of a hydrogenated butadiene polymer adhesive, said hydrogenated polymer being selected from the group consisting of hydrogenated homopolymers of butadiene and hydrogenated copolymers of butadiene and styrene containing not over 30 percent of bound styrene, said hydrogenated polymer having an unsaturation from 5 to 50 percent of the unsaturation of the unhydrogenated polymer, and pressing together the aluminum and ethylene polymer to be bonded while heating at a temperature exceeding the softening point of the ethylene polymer, but not more than 150 Fahrenheit degrees above said softening point, to cure said adhesive.

6. The method of claim 5 in which the adhesive is applied to the surface of each of the articles to be bonded.

7. A method for bonding aluminum and polyethylene which comprises coating at least one of the surfaces to be bonded with a hydrogenated polymer adhesive, said hydrogenated polymer being selected from the group consisting of hydrogenated homopolymers of butadiene and hydrogenated copolymers of butadiene and styrene containing not over 30 percent of bound styrene, said hydrogenated polymer having an unsaturation in the range of 5 to 30 percent of the unsaturation of the unhydrogenated polymer, evaporating the solvent from the adhesive and pressing the aluminum and polyethylene to be bonded while heating at a temperature exceeding the softening point of the polyethylene, but not more than 150 Fahrenheit degrees above said softening point to cure said adhesive.

8. The method of claim 7 in which the butadiene polymer is hydrogenated polybutadiene.

9. The method of claim 8 in which curing of the adhesive is effected at a temperature of about 300° F. for a period of about 30 to 40 minutes.

10. A method of bonding a solid polymer of ethylene to an aluminum surface which method comprises degreasing said aluminum surface by treatment with a solvent selected from the group consisting of carbon tetrachloride and tetrachloroethane; cleaning the degreased aluminum surface with chromic acid; applying to the cleaned surface a solution of a hydrogenated polymer selected from the group consisting of hydrogenated homopolymers of butadiene and hydrogenated copolymers of butadiene and styrene containing not over 30 percent of bound styrene, said hydrogenated polymer having an unsaturation in the range 5 to 30 percent of the unsaturation of the unhydrogenated polymer, together with a sulfur-containing curing agent for said hydrogenated polymer, the solvent for said polymer being selected from the group consisting of benzene, toluene, cyclohexane, methylcyclohexane, Decalin, tetralin, and isooctane, the polymer concentration of said solution being in the range 2 to 10 weight percent; evaporating solvent at a temperature not exceeding 150° F.; pressing together said polymer and said aluminum surface to which said hydrogenated polymer has been applied as herein described; and applying heat to the resulting laminate, while pressing as described, to maintain the mutually contacting parts of said laminate at a temperature above the softening point of said ethylene polymer and in the range 200 to 500° F.; continuing the application of heat to effect curing of said hydrogenated polymer; and recovering a resulting laminate.

References Cited in the file of this patent

UNITED STATES PATENTS

| | | |
|---|---|---|
| 2,046,160 | Graves | June 30, 1936 |
| 2,046,257 | Flint | June 30, 1936 |
| 2,543,229 | Chapman | Feb. 27, 1951 |
| 2,581,920 | Kuhn | Jan. 8, 1952 |
| 2,622,056 | De Coudres et al. | Dec. 16, 1952 |
| 2,692,841 | Frank et al. | Oct. 26, 1954 |
| 2,693,461 | Jones | Nov. 2, 1954 |

UNITED STATES PATENTS

| | | |
|---|---|---|
| 2,751,322 | Bost | June 19, 1956 |
| 2,813,809 | Jones et al. | Nov. 19, 1957 |
| 2,864,809 | Jones et al. | Dec. 16, 1958 |

FOREIGN PATENTS

| | | |
|---|---|---|
| 618,345 | Great Britain | Feb. 21, 1949 |

OTHER REFERENCES

"Bonding Plastics to Rubber and Metals," Journal of the Franklin Institute, page 402, November 1957.

Modern Synthetic Rubbers by Harry Barron 1949, Table 115 on page 341.